United States Patent
Thorén

(10) Patent No.: US 10,100,977 B2
(45) Date of Patent: Oct. 16, 2018

(54) LIQUID DISTRIBUTION SYSTEM

(71) Applicant: VOLVO CONSTRUCTION EQUIPMENT AB, Eskilstuna (SE)

(72) Inventor: Pierre Thorén, Strängnäs (SE)

(73) Assignee: Volvo Construction Equipment AB, Eskilstuna (SE)

( * ) Notice: Subject to any disclaimer, the term of this patent is extended or adjusted under 35 U.S.C. 154(b) by 123 days.

(21) Appl. No.: 14/901,175

(22) PCT Filed: Jul. 5, 2013

(86) PCT No.: PCT/SE2013/000108
§ 371 (c)(1),
(2) Date: Dec. 28, 2015

(87) PCT Pub. No.: WO2015/002577
PCT Pub. Date: Jan. 8, 2015

(65) Prior Publication Data
US 2016/0305606 A1    Oct. 20, 2016

(51) Int. Cl.
*F16N 7/38* (2006.01)
*F16H 57/04* (2010.01)
*E02F 9/12* (2006.01)
*F16N 7/40* (2006.01)
*E02F 3/32* (2006.01)
*E02F 3/34* (2006.01)

(52) U.S. Cl.
CPC ............. *F16N 7/38* (2013.01); *E02F 9/126* (2013.01); *F16H 57/0408* (2013.01); *F16N 7/40* (2013.01); *E02F 3/32* (2013.01); *E02F 3/34* (2013.01)

(58) Field of Classification Search
CPC .... F16N 7/38; F16N 7/40; E02F 9/126; F16H 57/0408
See application file for complete search history.

(56) References Cited

U.S. PATENT DOCUMENTS

| 4,899,850 A | * | 2/1990 | Koller | F01D 25/20 184/27.2 |
| 4,926,641 A | * | 5/1990 | Keller | F01D 25/20 184/6.13 |
| 5,099,955 A | * | 3/1992 | Mangen | F16N 7/38 184/105.1 |

(Continued)

FOREIGN PATENT DOCUMENTS

AU    2011100486 B4    6/2011
FR    2356615 A1    2/1976

OTHER PUBLICATIONS

International Search Report (dated Mar. 5, 2014) for corresponding International App. PCT/SE2013/000108.

(Continued)

*Primary Examiner* — Michael A Riegelman
(74) *Attorney, Agent, or Firm* — WRB-IP LLP

(57) ABSTRACT

A liquid distribution system for a hub includes a liquid supply portion arranged to supply liquid to at least one component located within the hub. The liquid distribution system further includes a liquid evacuator portion arranged to act on liquid being inside the hub evacuating liquid from the hub. The liquid evacuator portion is arranged to be driven by liquid that flows via the liquid supply portion for evacuating liquid from the hub.

14 Claims, 4 Drawing Sheets

(56) References Cited

U.S. PATENT DOCUMENTS

| | | | | |
|---|---|---|---|---|
| 5,554,278 | A * | 9/1996 | Henderson | F01M 11/04 123/575 |
| 5,806,629 | A * | 9/1998 | Dixon | F01M 11/0458 141/98 |
| 6,065,567 | A * | 5/2000 | Camacho | F01M 11/0458 141/98 |
| 6,202,790 | B1 * | 3/2001 | Oligmueller | A01D 46/088 184/6 |
| 8,714,310 | B2 * | 5/2014 | Bares | B60B 35/12 165/297 |
| 2006/0054404 | A1 * | 3/2006 | El-Ibiary | F16C 33/1085 184/6 |
| 2009/0050412 | A1 * | 2/2009 | Bares | B60B 35/12 184/22 |
| 2012/0266970 | A1 * | 10/2012 | Ramler | B60B 35/00 137/15.01 |

OTHER PUBLICATIONS

International Preliminary Report on Patentability (dated May 28, 2015) for corresponding International App. PCT/SE2013/000108.
European Official Action (dated Mar. 24, 2017) for corresponding European App. EP13888515.

* cited by examiner

LIQUID DISTRIBUTION SYSTEM

BACKGROUND AND SUMMARY

The present disclosure relates to a liquid distribution system for a hub. Moreover, the present disclosure relates to a hub. Further, the present disclosure relates to a swing system. Additionally, the present disclosure relates to a vehicle.

A vehicle, for instance a working machine, such as a wheel loader, an articulated hauler or any other type of construction equipment, may comprise one or more hubs. For instance, one or more of the wheels of the vehicle may comprise a hub.

Moreover, a working machine may comprise other components, such as a swing system, that may also comprise a hub.

A hub may comprise one or more components to which liquid, such as oil, may be fed for e.g. cooling and/or lubrication purposes. However, the liquid that is fed to the hub eventually also needs to be evacuated from the hub.

To this end, AU 2011100486 proposes that oil be evacuated from a hub by gravity.

However, the use of gravity for evacuation of liquid from a hub may place restrictions on structures, such as an axle, that are connected to the hub. Moreover, there is a risk that the use of gravity alone does not result in a sufficiently high flow rate of the liquid that is to be evacuated from the hub.

It is desirable to provide a liquid distribution system for a hub which system is adapted to evacuate liquid from the hub in an appropriate manner.

As such, an aspect of the present disclosure relates to a liquid distribution system for a hub. The liquid distribution system comprises a liquid supply portion arranged to supply liquid to at least one component located within the hub. The liquid distribution system further comprises a liquid evacuator portion arranged to act on liquid being inside the hub for evacuating liquid from the hub.

According to the present disclosure, the liquid evacuator portion is arranged to be driven by liquid that flows via the liquid supply portion for evacuating liquid from the hub.

By virtue of the fact that the liquid evacuator portion is arranged to be driven by the liquid that flows via the liquid supply portion, the need for arranging additional power transmitting members to the hub, such as a transmission assembly or electrical cables to an electric motor, may be reduced or even omitted.

Instead, the liquid distribution system according to the present disclosure implies that the evacuation of liquid from the hub may be powered by the liquid that flows to the hub.

Optionally, the liquid evacuator portion is arranged to be driven by liquid that flows via the liquid supply portion to the component for evacuating liquid from the hub.

Optionally, the liquid evacuator portion is adapted to be accommodated within the hub. Such a position of the liquid evacuator portion implies that a compact evacuator may be obtained.

Optionally, the liquid evacuator portion comprises a liquid pump. Moreover, the liquid evacuator portion may optionally comprise a liquid powered motor connected to the liquid pump. Optionally, the at least one component located within the hub is located downstream, in an intended flow direction of the liquid distribution system, the liquid powered motor.

The above configuration of the liquid distribution system implies that liquid that flows towards the at least one component powers the liquid evacuator portion prior to reaching the at least one component. This in turn implies that the liquid evacuator portion may be fed with sufficient liquid power.

Optionally, the liquid supply portion comprises a first liquid conduit assembly adapted to be connected to a liquid source outside of the hub, the first liquid conduit assembly being in fluid communication with an inlet of the liquid powered motor.

Optionally, the liquid supply portion comprises a second liquid conduit assembly comprising an end portion that is adapted to be located outside of the hub. The second conduit assembly provides a fluid communication between an outlet of the liquid powered motor and the end portion of the second liquid conduit assembly.

The above configuration of the liquid distribution system implies that that the liquid distribution system may be fed by liquid at a higher pressure and/or flow rate than what is needed in order to serve the at least one component with liquid. As such, the excess liquid power may be used for driving the liquid evacuator portion.

Moreover, the liquid distribution system may optionally comprise a check valve located between, as seen in an intended flow direction, the outlet of the liquid powered motor and the end portion of the second liquid conduit assembly. The check valve implies a reduced risk the liquid that is fed from the evacuation liquid pump will reach the at least first component and/or the liquid powered motor.

A second aspect of the present disclosure relates to a hub comprising a liquid distribution system.

A third aspect of the present disclosure relates to a swing system comprising a hub according to the first aspect of the present disclosure and/or a liquid distribution system according to the first aspect of the present disclosure.

A fourth aspect of the present disclosure relates to a vehicle comprising a swing system according to the third aspect of the present disclosure and/or a hub according to the second aspect of the present disclosure and/or a liquid distribution system according to the first aspect of the present disclosure.

BRIEF DESCRIPTION OF THE DRAWINGS

With reference to the appended drawings, below follows a more detailed description of embodiments of the invention cited as examples.

In the drawings.

It should be noted that the appended drawings are not necessarily drawn to scale and that the dimensions of some features of the present invention may have been exaggerated for the sake of clarity.

DETAILED DESCRIPTION

The invention will below be described for a vehicle in the form of a wheel loader 1 such as the one illustrated in FIG. 1. The wheel loader 1 should be seen as an example of a vehicle which could comprise a liquid distribution system according to the present invention. However, the liquid distribution system of the present invention may be implemented in a plurality of different types of vehicles. Purely by way of example, the pressurized medium assembly could be implemented in a truck, a lorry, a tractor, a car, a bus or any type of work machine.

Figure 1:
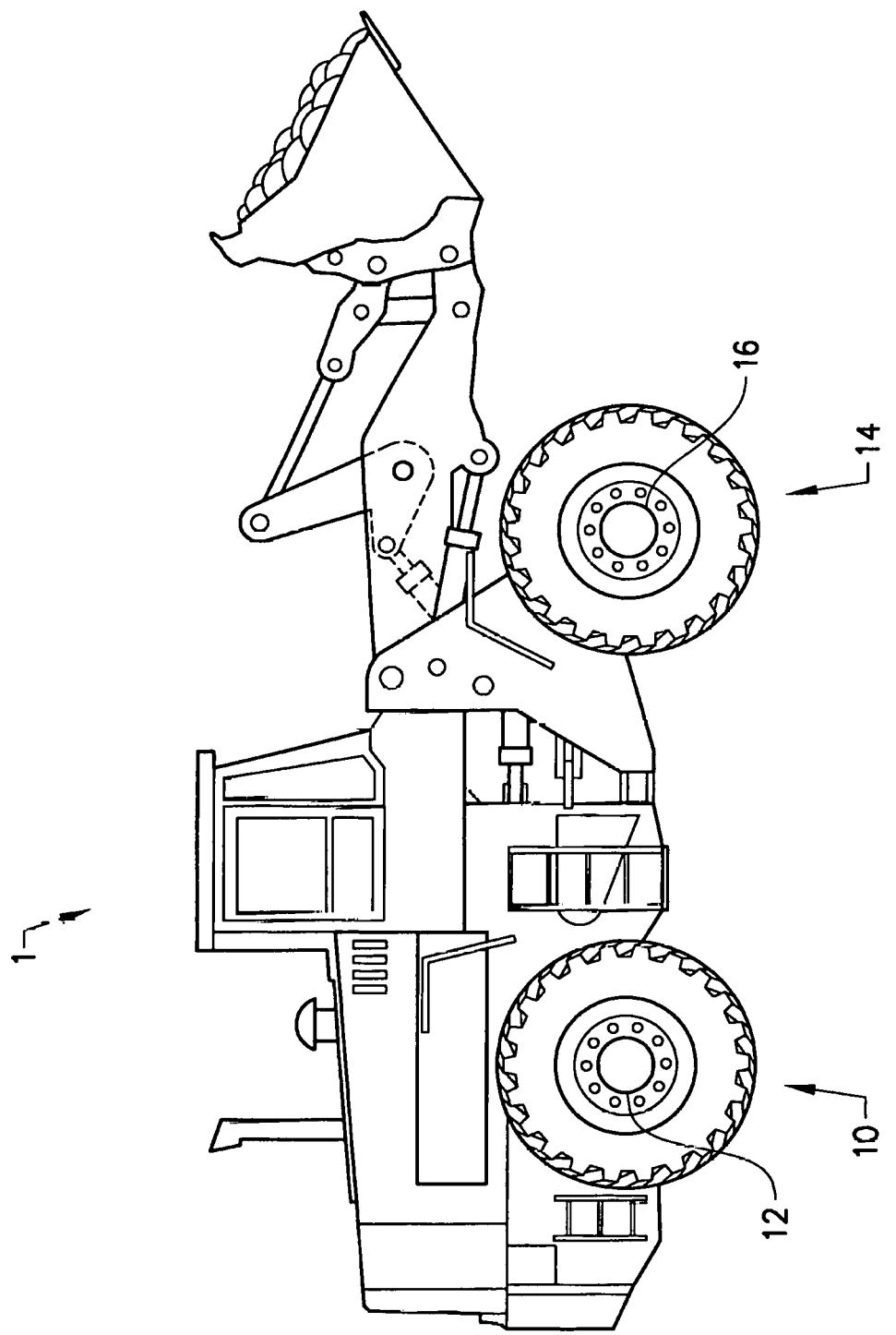
FIG. 1 illustrates a wheel loader.

The FIG. 1 wheel loader 1 comprises a plurality of wheels each one of which in turn comprises a hub. In FIG. 1, two of the wheels of the wheel loader 1 are visible, viz a first wheel 10 comprising a first hub 12 and a second wheel 14 comprising a second hub 16.

Figure 2:
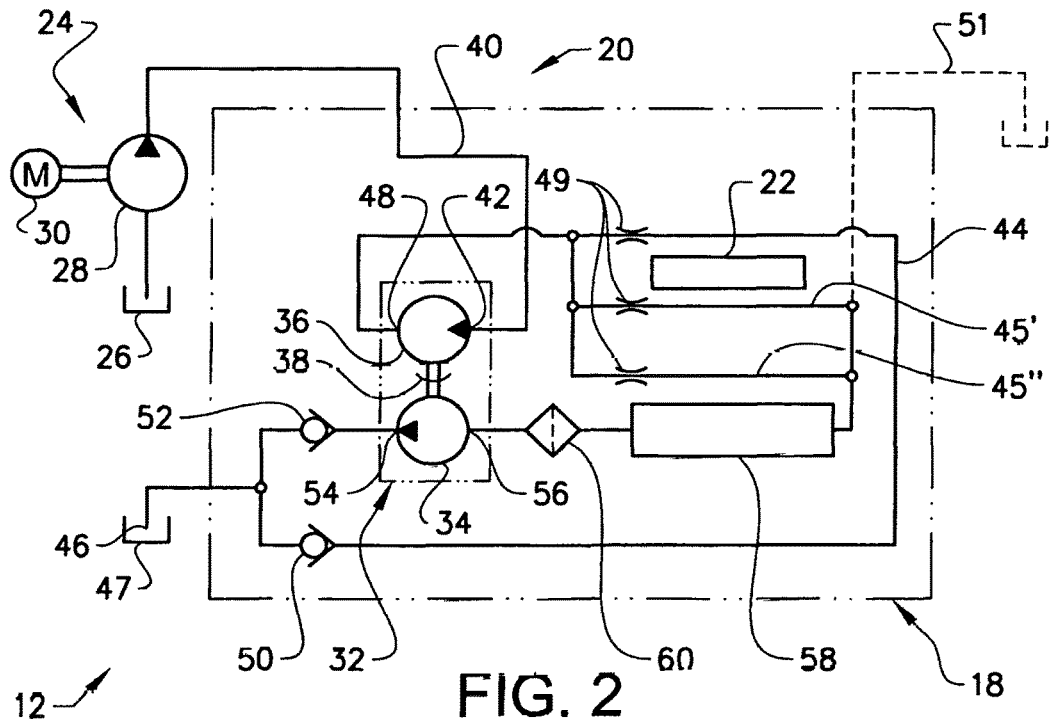
FIG. 2 illustrates an embodiment of a liquid distribution system.

FIG. 2 illustrates a portion of the first hub 12 indicated in FIG. 1. The first hub 12 comprises an embodiment of the liquid distribution system 18 according to the present invention. However, it should be noted that each one of a plurality of the wheels of a vehicle may comprise a hub which in turn comprises an embodiment of the liquid distribution system 18 according to the present invention.

As may be gleaned from FIG. 2, the liquid distribution system 18 comprises a liquid supply portion 20 arranged to supply liquid to at least one component 22 located within the hub. Purely by way of example, the at least one component 22 may comprise a brake, gears or splines that are located within the hub. As another non-limiting example, the at least one component 22 may comprise the inner surface of the hub 12 which inner surface for instance may be cooled by liquid.

Liquid may be supplied to the at least one component 22 for a plurality of purposes.

Purely by way of example, liquid may be supplied for cooling and/or lubrication purposes.

The liquid supply portion 20 may be adapted to be connected to a pressurized liquid supply assembly 24. Purely by way of example, and as is indicated in the FIG. 2 embodiment, the pressurized liquid supply assembly 24 may comprise a liquid source 26, which in FIG. 2 is exemplified as a tank, and a pump 28. As a non-limiting example, the pump 28 may be connected, for instance mechanically connected, to a motor 30.

The liquid supply portion 20 is generally arranged to feed liquid into the hub 12. Moreover, in embodiments of the liquid distribution system 18, the liquid supply portion 20 may also be adapted to guide liquid out of the hub 12.

As a non-limiting example, the liquid may be a hydraulic liquid. As used herein, the term "hydraulic liquid" is intended to include hydraulic oil as well as any other liquids which possibly may occur in a hydraulic system. As another non-limiting example, the liquid may comprise water and/or any other type of oil.

Moreover, and as is indicated in FIG. 2, the liquid distribution system 18 further comprises a liquid evacuator portion 32 arranged to act on liquid being inside the hub 12 for evacuating liquid from the hub 12. The liquid evacuator portion 32 is arranged to be driven by liquid that flows via the liquid supply portion 20 for evacuating liquid from the hub 12.

In the FIG. 2 embodiment, the liquid evacuator portion 32 is arranged to be driven by liquid that flows via the liquid supply portion 20 to the at least one component 22 for evacuating liquid from the hub 12. As such, in the FIG. 2 embodiment, at least a portion of the liquid that flows via the liquid supply portion 20 firstly chives the liquid evacuator portion 32 and thereafter reaches the at least one component 22. However, it is also envisaged that, in example embodiments of the liquid distribution system 18, the liquid evacuator portion 32 be driven by at least a portion of the liquid that flows via the liquid supply portion 20 that has already passed the at least one component 22.

As another non-limiting example, the liquid evacuator portion 32 may be driven by at least a portion of the liquid that flows via the liquid supply portion 20 which liquid portion does not pass the at least one component 22. An embodiment of the liquid distribution system 18 using the above option for driving the liquid evacuator portion 32 is presented hereinbelow with reference to FIG. 3.

As a non-limiting example, the liquid evacuator portion 32 may be adapted to be accommodated within the hub 12.

In the embodiment of the liquid distribution system 18 illustrated in FIG. 2, the liquid evacuator portion 32 is arranged to be driven by liquid that flows via the liquid supply portion 20 by virtue of the fact that the liquid evacuator portion 32 comprises a liquid pump 34 as well as a liquid powered motor 36 connected to the liquid pump 34. As such, liquid powered motor 36 is adapted to supply energy to the liquid pump 34. Purely by way of example, the liquid powered motor 36 may be mechanically connected to the liquid pump 34, for instance by means of a shaft 38.

FIG. 2 further illustrates that the liquid supply portion 20 comprises a first liquid conduit assembly 40 adapted to be connected to a liquid source outside of the hub, which liquid source is exemplified by the pressurized liquid supply assembly 24 in FIG. 2. The first liquid conduit assembly 40 is in fluid communication with an inlet 42 of the liquid powered motor 36.

Moreover, in the embodiment illustrated in FIG. 2, the at least one component 22 located within the hub is located downstream, in an intended flow direction of the liquid distribution system, the liquid powered motor 36. As such, and as is indicated in FIG. 2, the liquid that flows in the liquid supply portion 20 from the pressurized liquid supply assembly 24 firstly passes the liquid powered motor 36 and thereafter reaches the at least one component 22.

FIG. 2 further illustrates that the liquid supply portion 20 comprises a second liquid conduit assembly 44 comprising an end portion 46 that is adapted to be located outside of the hub 12. The second conduit assembly 44 provides a fluid communication between an outlet 48 of the liquid powered motor 36 and the end portion 46 of the second liquid conduit assembly 44. As may be gleaned from FIG. 2, the end portion 46 may be located such that it can discharge liquid into a liquid reservoir 47, such as a tank. As a non-limiting example, the liquid reservoir 47 may be in fluid communication with the liquid source 26 that has been discussed hereinabove. Purely by way of example, the liquid reservoir 47 and the liquid source 26 may be the same component.

Moreover, the liquid distribution system 18 may optionally comprise a first check valve 50 located between, as seen in an intended flew direction, the outlet 48 of the liquid powered motor 36 and the end portion 46 of the second liquid conduit assembly 44. In the embodiment of the liquid distribution system 18 illustrated in FIG. 2, the second liquid conduit assembly 44 comprises the check valve 50.

The presence of the first check valve 50 implies a reduced risk that liquid that is fed from the liquid evacuator portion 32, e.g. from the liquid pump 34, flows in a direction towards the liquid powered motor 36.

In a similar vein, the liquid distribution system 18 may optionally comprise a second check valve 52 located between, as seen in an intended flow direction, the high side 54 of the liquid pump 34 and the end portion 46 of the second liquid conduit assembly 44.

The presence of the second check valve 52 implies a reduced risk that liquid that flows in the second liquid conduit assembly 44 enters the high side 54 of the liquid pump 34.

FIG. 2 further illustrates that the liquid distribution system may comprise a liquid sump 58 that is adapted to be located within the hub 12. The liquid sump 58 is adapted to be in fluid communication with the liquid evacuator portion 32, e.g. the liquid pump 34.

In addition FIG. 2 illustrates that the liquid supply portion 20 may comprise one or more additional liquid conduit assemblies 45', 45" each one of which extending from the second liquid conduit assembly 44 to the liquid sump 58. Moreover, each one of the additional liquid conduit assemblies 45', 45" may pass a hub component, such as the at least one component 22 that has been discussed hereinabove and/or an additional component (not shown) that is located within the hub 12.

At least one of the second liquid conduit assembly 44 and the additional liquid conduit assemblies 45', 45" may comprise a throttling 49 for controlling the liquid flow through the liquid conduit assembly concerned. Instead of, or in addition to the above discussed throttling, at least one of the second liquid conduit assembly 44 and the additional liquid conduit assemblies 45', 45" may comprise a liquid controlling valve (not shown in FIG. 2).

Moreover, FIG. 2 illustrates that the liquid distribution system 18 may comprise a ventilation assembly 51 adapted to drain of gas, such as air, from the hub 12. As a non-limiting example, the ventilation assembly 51 may be in fluid communication with at least one of the additional liquid conduit assemblies 45', 45".

As is indicated in the FIG. 2 embodiment, the liquid sump 58 may be located between, as seen in an intended flow direction, the liquid powered motor 36 and the liquid evacuator portion 32, e.g. the liquid pump 34. Moreover, FIG. 2 illustrates an embodiment of the liquid distribution system 18 in which the liquid sump 58 is located between, as seen in an intended flow direction, the at least one component 22 and the liquid pump 32.

Moreover, FIG. 2 illustrates an embodiment of a liquid distribution system 18 which comprises a filter 60 located between, as seen in an intended flow direction, the liquid sump 58 and the liquid pump 34.

Figure 3:
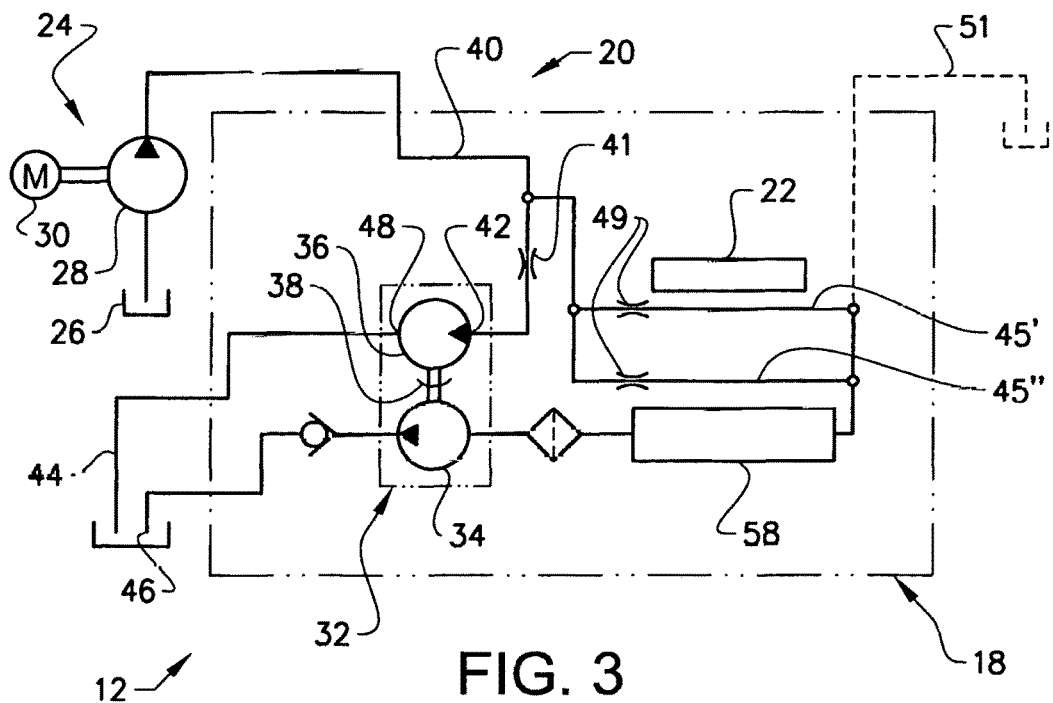
FIG. 3 illustrates another embodiment of a liquid distribution system.

FIG. 3 illustrates another embodiment of a liquid distribution system 18. As compared to the FIG. 2 embodiment, the second liquid conduit assembly 44 of the FIG. 3 embodiment is adapted to discharge liquid directly to the liquid reservoir 47. As such, in the FIG. 3 embodiment, the additional liquid conduit assemblies 45', 45" may be connected to the first liquid conduit assembly 40. In other words, the additional liquid conduit assemblies 45', 45" may be connected to a portion of the liquid supply portion 20 that is located upstream of the liquid powered motor 36.

With the FIG. 3 embodiment, the need for check valves may be reduced and the FIG. 3 embodiment may be appropriately reliable in running even without check valves.

Figure 4:
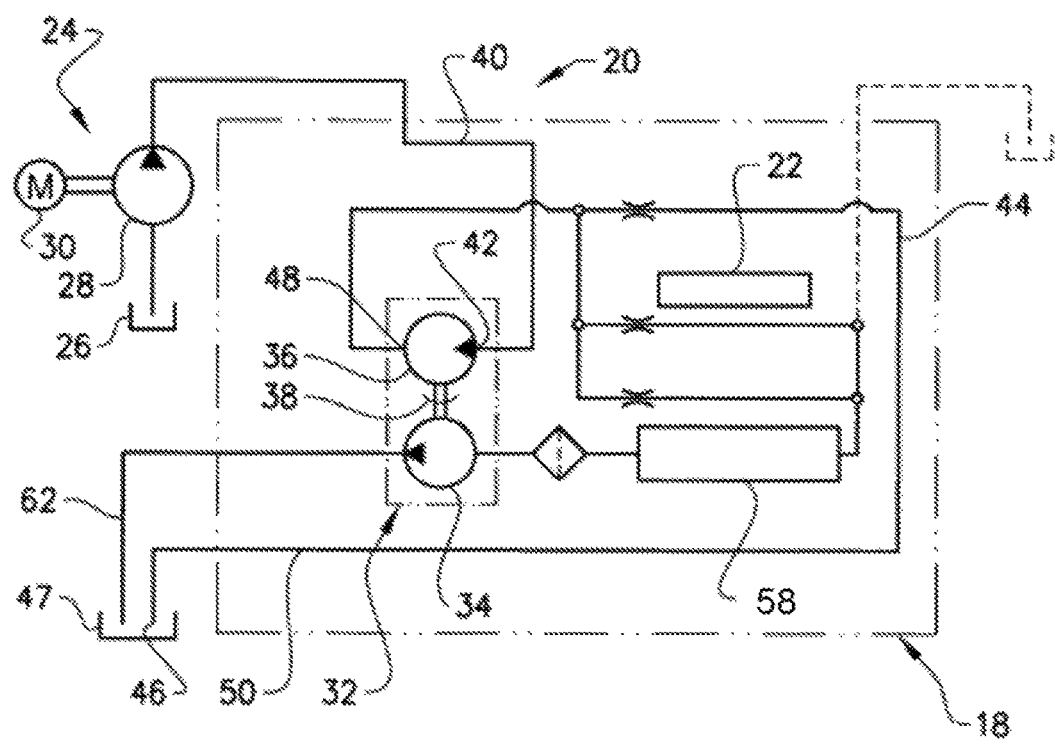
FIG. 4 illustrates a further embodiment of a liquid distribution system.

FIG. 4 illustrates a further embodiment of a liquid distribution system 18. The FIG. 4 embodiment comprises an evacuator conduit assembly 62 that is adapted to discharge liquid from the liquid evacuator portion 32 to a liquid reservoir 47. Moreover, the evacuator conduit assembly 62 is separated from the second liquid conduit assembly 44. As for the FIG. 3 embodiments, the FIG. 4 embodiment may also be appropriately reliable in running even without check valves.

It should be noted that features of the three embodiments discussed hereinabove and illustrated in each one of FIG. 2 to FIG. 4 may be combined so as to obtain additional embodiments of the liquid distribution system 18.

Figure 5:
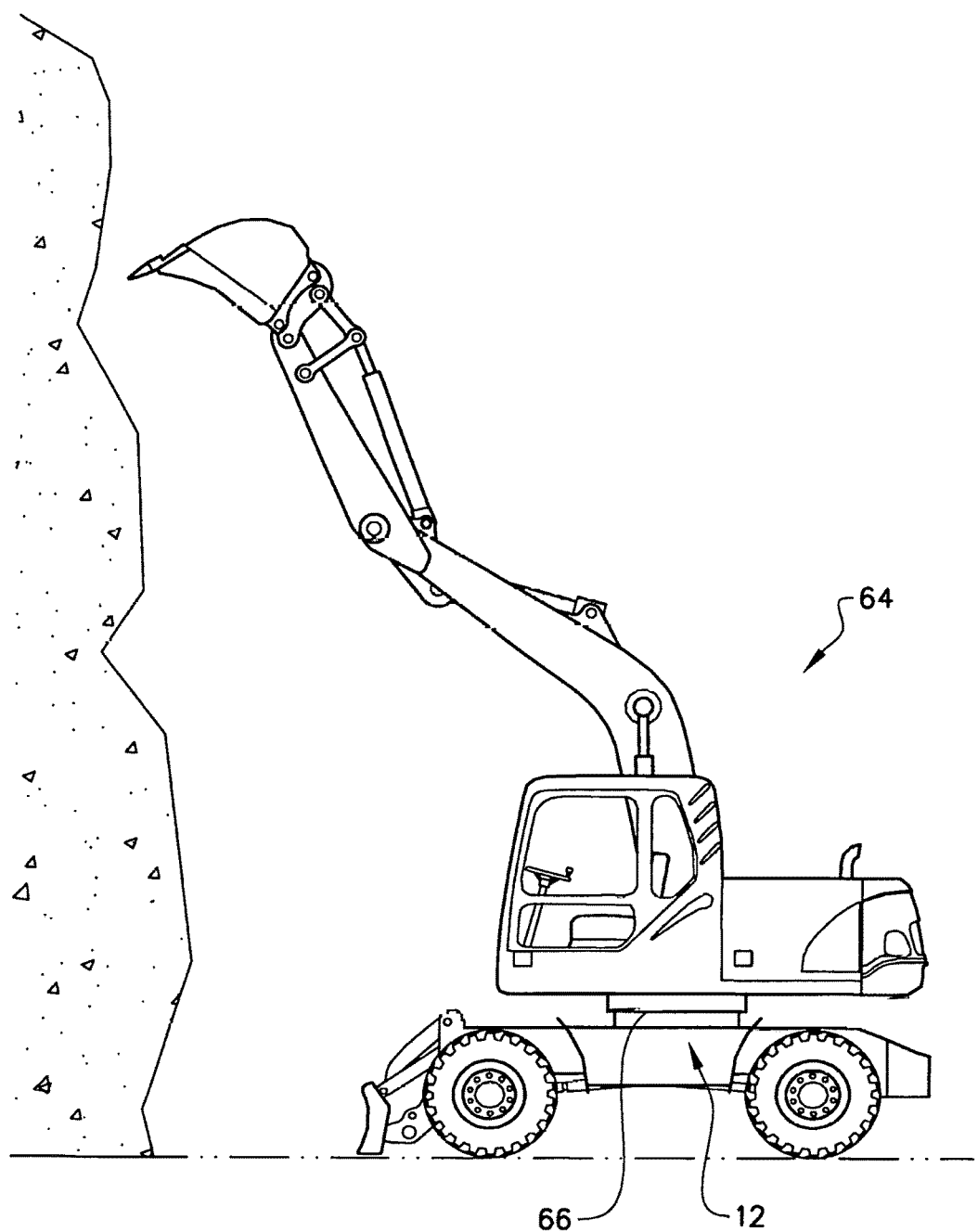
FIG. 5 illustrates an excavator.

The expression "hub" may be related to a centre member around which another object is adapted to revolve and/or from which another object, or other objects, radiates. As a non-limiting example, an axle may be connected to a hub. Although the hub has been exemplified as a wheel hub in FIG. 1, it is also envisaged that the liquid distribution system 18 may be used in other types if hubs. To this end, FIG. 5 illustrates an excavator 64 that comprises a swing system 66 allowing an upper portion of the excavator to pivot in relation to a lower portion thereof. The swing system 66 may comprise a hub 12 which in turn comprises a liquid distribution system as described hereinabove (not shown in FIG. 5).

Finally, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A liquid distribution system for a hub, the liquid distribution system comprising a liquid supply portion arranged to supply liquid to at least one component located within the hub, the liquid distribution system further comprising a liquid evacuator portion arranged to act on liquid being inside the hub for evacuating liquid from the hub, wherein the liquid evacuator portion is arranged to be driven by liquid that flows via the liquid supply portion for evacuating liquid from the hub, wherein the liquid evacuator portion comprises a liquid pump, and wherein the liquid evacuator portion, including the liquid pump, is adapted to be accommodated within the hub.

2. The liquid distribution system according to, claim 1, wherein the liquid evacuator portion is arranged to be driven by liquid that flows via the liquid supply portion to the component for evacuating liquid from the hub.

3. The liquid distribution system according to claim 1, wherein the liquid evacuator portion comprises a liquid powered motor connected to the liquid pump.

4. The liquid distribution system according to claim 3, wherein the at least one component located within the hub is located downstream, in an intended flow direction of the liquid distribution system, of the liquid powered motor.

5. The liquid distribution system according to claim 3, wherein the liquid supply portion comprises a first liquid conduit assembly (40) adapted to be connected to a liquid source outside of the hub, the first liquid conduit assembly being in fluid communication with an inlet of the liquid powered motor.

6. The liquid distribution system according to claim 3, wherein the liquid supply portion comprises a second liquid conduit assembly comprising an end portion that is adapted to be located outside of the hub, the second conduit assembly providing a fluid communication between an outlet of the liquid powered motor and the end portion of the second liquid conduit assembly.

7. The liquid distribution system according to claim 6, wherein the liquid distribution system comprises a first check valve located between, as seen in an intended flow direction, the outlet of the liquid powered motor and the end portion of the second liquid conduit assembly.

8. The liquid distribution system according to claim 1, wherein the liquid distribution system comprises a liquid sump that is adapted to be located within the hub, the liquid evacuator portion being adapted to be in fluid communication with the liquid sump.

9. The liquid distribution system according to claim 8, wherein the liquid sump is located between, as seen in an intended flow direction, the liquid powered motor and the liquid pump.

10. The liquid distribution system according to claim 8, wherein the liquid sump is located between, as seen in an intended flow direction, the at least one component and the liquid pump.

11. The liquid distribution system according to claim 1, wherein the liquid distribution system comprises a filter located between, as seen in an intended flow direction, the liquid sump and the liquid pump.

12. A swing system comprising the liquid distribution system according to claim 1.

13. A vehicle comprising the liquid distribution system according to claim 1.

14. A hub comprising a liquid distribution system, the liquid distribution system comprising a liquid supply portion arranged to supply liquid to at least one component located within the hub, the liquid distribution system further comprising a liquid evacuator portion arranged to act on liquid being inside the huh for evacuating liquid from the hub, wherein the liquid evacuator portion is arranged to be driven by liquid that flows via the liquid supply portion for evacuating liquid from the hub, wherein the liquid evacuator portion comprises a liquid pump, and wherein the liquid evacuator portion, including the liquid pump, is accommodated within the hub.

* * * * *